United States Patent [19]

Worschech et al.

[11] 3,917,555

[45] Nov. 4, 1975

[54] LUBRICANTS FOR THERMOSETTING RESIN MOLDING COMPOSITION

[75] Inventors: Kurt Worschech, Bexhoevede; Rudi Heyden, Hochdahl-Millrath; Kurt Wolf, Bremerhaven; Manfred Jaeckel, Loxstedt; Michael Eckelt, Dusseldorf-Urdenbach, all of Germany

[73] Assignee: Neynaber Chemie GmbH, Bremerhaven, Germany

[22] Filed: May 22, 1974

[21] Appl. No.: 472,478

[30] Foreign Application Priority Data
May 26, 1973  Germany................................ 2326978

[52] U.S. Cl............. 260/31.4 R; 260/38; 260/39 R; 260/39 SB
[51] Int. Cl.²........................................... C08K 5/10

[58] Field of Search................ 260/31.4 R, 31.4 EP

[56] References Cited
UNITED STATES PATENTS
3,177,174    4/1965    Tirpak............................ 260/31.4 R Primary Examiner—Lewis T. Jacobs
Attorney, Agent, or Firm—Hammond & Littell

[57] ABSTRACT

Lubricant additives to molding compositions based on thermosetting condensation resins for the shaping of the resins which comprise a content of esters of a) addition products of ethylene oxide or ethylene oxide/-propylene oxide or organic compounds containing one, two or three alcoholic hydroxyl groups with b) mono, di-, or tri-carboxylic acids; as well as the process of conducting thermosetting condensation reactions in the presence of said lubricant additives.

13 Claims, 2 Drawing Figures

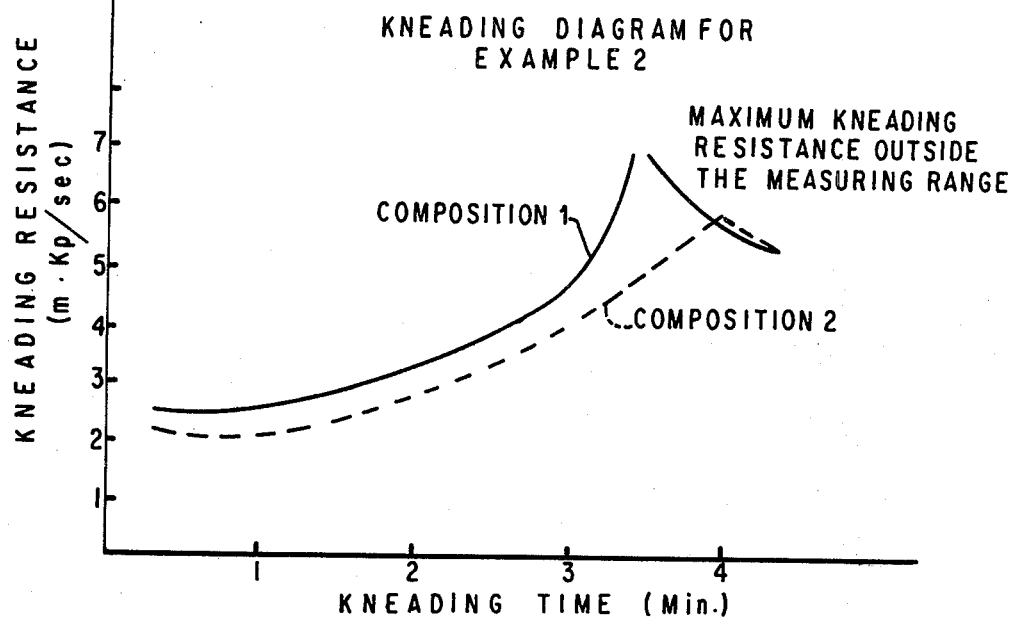
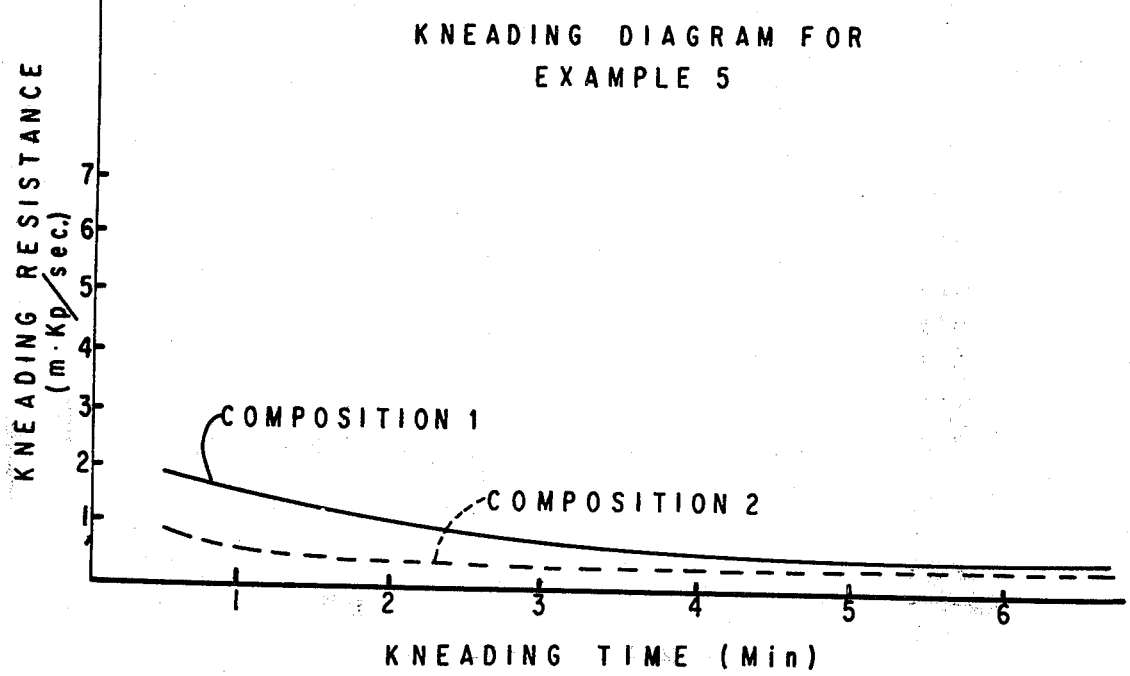

LUBRICANTS FOR THERMOSETTING RESIN MOLDING COMPOSITION

THE PRIOR ART

Molding compositions based on thermosetting condensation resins contain binders which can be cross-linked under the action of heat and pressure and undergo polycondensation, and also contain cross-linking agents, hardening accelerators, fillers, pigments, elasticizers, stabilizers and lubricants.

The principal binders of thermosetting molding compositions are precondensed resins, either phenol resins of the resoltype or the novolac-type, obtained by condensation of phenol, cresols, xylenols, naphthols or polyhydroxy phenols with formaldehyde, polymeric formaldehyde or other aldehydes, or aminoplast resins, obtained by condensation of urea, guanadine, substituted ureas, melamine, substituted melamines, or aniline with formaldehyde, polymeric formaldehyde, furfural or other aldehydes. A thermosetting molding composition can also contain several binders in admixture, for example, a phenol resin-novolac and a melamine-formaldehyde resin. Hexamethylene tetramine is added to thermosetting compositions based on phenol resinnovolacs as a cross linking agent during the thermosetting.

Fillers, such as chalk, heavy spar, ground shale or mica, wood or cellulose meal, and filler material in the form of fibers or chips, for example asbestos, glass fibers, cellulose, linters, wood chips, fabric chips, or polyamide fibers. For the production of flat-shaped semi-finished products, particularly pressed plates, fabric webs or paper webs are used as reinforcing fillings.

In addition to other additives, such as pigments, hardening accelerators, elasticizers and stabilizers, lubricants are added to the thermosetting molding compositions.

In the production of the thermosetting molding compositions, the mixing of the thermosetting resin with the fillers and other additives is of particular importance. Thus, the precondensed resin after drying and crushing can be mixed with fillers and other additives on one or several rolling mills, in a kneader or in a screw press; then be further condensed and finally crushed. Frequently the resin is not dried and the fillers and other additives are added to an aqueous or alcoholic dispersion or solution of the resin, homogenized in the kneader and dried just before the final crushing. This method is used primarily in the preparation or urea - or melamine-formaldehyde resins with cellulose fillers and the method presents special problems for the distribution of the lubricants. For the production of pressed plates, the precondensed resins are likewise used in the form of their solutions or dispersions, and the reinforcing fabric or textile webs are impregnated with them.

The lubricants should preferably be added during the production of the resin precondensates, but at the latest they should be added during the preparation of the molding compounds to give molding powders, chips, pellets or tablets, in order to prevent the thermosetting resins from sticking to and prematurely hardening within the manufacturing apparatus such as rolling mills, granulation extruders or tablet presses. During the shaping treatment by pressing, extrusion or injection-molding, the lubricants improve the flow ability of the molding compositions to ensure proper filling of the mold. In addition the lubricants facilitate the removal of the finished molded part from the mold, and thus eliminate the necessity of treating the mold with an external mold releasing agent. The interaction of improved fluidity and internal mold releasing effect impart to the finished parts a homogeneous, closed and smooth surface.

Among the lubricants used heretofore in the prior art are, in particular, stearic acid and other fatty acids, metal soaps of fatty acids, such as calcium stearate, zinc stearate, magnesium stearate and aluminum stearates of varying basicity, natural waxes, such as beeswax or carnauba wax, synthetic waxes, such as montanic acid esters, cetyl palmitate, stearyl stearate or ethylene diamine di-stearate, paraffin waxes of various origins, mineral oils and tar oils.

All lubricants used or suggested heretofore in the prior art have proved to be only partly satisfactory or completely unsatisfactory. Thus it is difficult to obtain a satisfactory distribution within the molding composition of the above mentioned lubricants. This is particularly true if the precondensed resins are obtained in the form of an aqueous solution or dispersion, and are to be kneaded in this form with fillers. The hydrophobic nature of the above mentioned lubricants prevents a uniform distribution. In order to avoid this, the aqueous dispersion of a urea-formaldehyde resin is kneaded, for example, with bleached cellulose, and then dried and crushed. Then the lubricant is added for example, zinc stearate, and mixed in an additional operation. Metal soap can only be mixed with the other compounds in a ball mill which represents a very complicated operation. It has also been tried to use water soluble lubricants in order to eliminate this disadvantage, using high molecular waxlike polyethyleneglycols, oligomeric ethylene glycols, as well as their ethers, such as ethyldiglycol or butyltriglycol. But they did not yield satisfactory results. When the water was distilled off from the resin-filler dispersion, the lubricant remained in the mass to be molded, but it proved too ineffective to a considerable extent during the following shaping treatment to improve the fluidity and separation from the mold. In the preparation of the resins with fillers and other additives in the form of alcohol solutions, both the hydrophobic and the water-soluble lubricants were either difficult to disperse or they were not effective enough.

If a molding composition whose lubricant content is not dispersed homogenously is processed by extruding or injection molding, portions of the composition with a low lubricant content harden prematurely in the plasticizing cylinder, since these portions of the composition are locally heated too much by friction, due to a lack of adequate lubricating action.

Another considerable disadvantage of the presently known prior art lubricants is that their compatibility within the molding composition is diminished in an uncontrollable manner by the water of reaction formed during the hardening of the resin. An amount of lubricant necessary for the preparation of the composition from anhydrous resin, fillers and other additives on the mixing rollers frequently proves incompatible during the shaping treatment due to the water of reaction formed. Undesired deposits are then formed both on the finished part and in the molds. The deposits in the mold build up to such an extent in series production, that the contours of the parts are already changed after a few pressing operations.

It was not possible heretofore to meet all processing requirements with one lubricant. The metal soaps of fatty acids are best for separation from the mold but their influence on the melt viscosity is too low, particularly for the plasticization in injection molding. It has also been tried to combine different effect by using a combination of several lubricants, for example, metal soaps, and mineral oils. But this led to the mutual displacement effects, in addition to the already existing difficulties in the compatibilities of the individual lubricants.

As it can be seen from the foregoing considerations, there was no lack of attempts at mastering the difficulties occurring in the shaping treatment of thermosetting molding compounds of condensation resins. But despite all efforts, this problem could not as yet be solved in a satisfactory manner.

OBJECTS OF THE INVENTION

It is an object of the present invention to provide lubricant additives for molding compositions based on thermosetting condensation resins for the shaping of the compositions, said lubricant comprising ester of a) addition products of ethylene oxide or ethylene oxide/propylene oxide to organic compounds containing one, two or three alcoholic hydroxyl groups with b) mono-, di-, or tri-carboxylic acids.

It is another object of the present invention to provide a lubricant additive comprising partial or complete esters of a. addition products 8 to 100 mols of ethylene oxide or ethylene oxide/propylene oxide oer mol of an organic compound containing one, two or three alcoholic hydroxyl groups with b. aliphatic, cycloaliphatic, or aromatic mono-, di- or tri-carboxylic acids, where the alcohol component (a) and/or the acid component (b) contains an aliphatic hydrocarbon radical of 11 to 26 carbon atoms, said lubricant additive being used for the shaping of molding compositions based on thermosetting condensation resins.

It is a further object of the present invention to provide a shapable thermosetting resin composition containing the above-described lubricant additive, as well as providing a process for shaping thermosetting material.

These and other objects of the present invention will become apparent as the description thereof proceeds.

THE DRAWINGS

The present invention will be illustrated by reference to the following drawings which are not to be deemed limitative in any manner thereof, in which FIG. 1 is a kneading diagram for Example 2; and
FIG. 2 is a kneading diagram for Example 5.

DESCRIPTION OF THE INVENTION

The present invention concerns lubricant additives for molding compositions based on thermosetting condensation resins for the shaping of the compositions comprising esters of a) addition products of ethylene oxide or ethylene oxide/propylene oxide to organic compounds containing one, two or three alcoholic hydroxyl groups with b) mono-, di- or tri-carboxylic acids.

The present invention is further directed to lubricant additives being used for the shaping of molding compositions based on thermosetting condensation resins, comprising partial or complete esters of a. addition products of 8 to 100 mols ethylene oxide or ethylene oxide/propylene oxide per mol of an organic compound containing one, two or three alcoholic hydroxyl groups, with b. aliphatic, cycloaliphatic, or aromatic mono-, di- or tri-carboxylic acids, where either the alcohol component (a) and/or the acid component (b) contains an aliphatic hydrocarbon radical having 11 to 26 carbon atoms.

More particularly the present invention provide a lubricant additive useful in the shaping of thermosetting material comprising a partial or complete ester of (A) an addition product 8 to 100 mols of an alkylene oxide selected from the group consisting of ethylene oxide and mixtures of ethylene oxide and propylene oxide per mol of a hydrocarbon compound having 1 to 3 hydroxyl groups and 2 to 30 carbon atoms and (B) a hydrocarbon carboxylic acid having 1 to 3 carboxyl groups and 2 to 30 carbon atoms selected from the group consisting of an aliphatic carboxylic acid, a cycloaliphatic carboxylic acid and an aromatic carboxylic acid, with the proviso that at least one of the components (A) or (B) contain an aliphatic hydrocarbon radical of 11 to 26 carbon atoms.

The present invention also provides a shapable thermosetting material composition containing from 0.1% to 5% by weight of the above-described lubricant additive, with the balance up to 100% being a thermosetting material and fibers.

The present invention also provides an improvement in the process for shaping thermosetting material which comprises adding a lubricating agent to said thermosetting material and then shaping said thermosetting material; wherein the improvement consists in utilizing from 0.1% to 5% by weight of the abovedescribed lubricant additive, as said lubricating agent.

The alcohol component necessary for the production of the esters used according to the invention as additives consists of addition products of 8 to 100 mols of ethylene oxide (EO) or mixtures of ethylene oxide (EO)/propylene oxide (PrO) in any order or in admixture per one mol of hydrocarbon compound containing one, two or three alcoholic hydroxyl groups. Examples of suitable hydrocarbon compounds are aliphatic, cycloaliphatic or aromatic alcohols having 2 to 30 carbon atoms preferably 12 to 26 carbon atoms and having one, two or three hydroxyl groups; for example alkanols having 2 to 30 perferably 11 to 26 carbon atoms such as ethanol, 2-ethyl-hexanol, n-octanol, lauryl alcohol, cetyl alcohol or stearyl alcohol; mixtures or alkanols having 2 to 30 carbon atoms preferably 12 to 26 carbon atoms such as cetyl-stearyl-alcohol, mixtures, as well as mixtures of other fatty alcohols, as they are obtained from the natural oils and fats; branched-chain, higher alkanols having 8 to 30 carbon atoms preferably 11 to 26 carbon atoms obtained by Guerbet synthesis, such as isopalmityl alcohols; higher alkanols having 8 to 30, preferably 11 to 26 carbon atoms originating from the oxosynthesis like isotridecyl alcohol; alkanediols having 2 to 30 carbon atoms preferably 11 to 26 carbn atoms such as hydroxystearyl alcohol, ethylene glycol, propylene glycol, 1,3-butanediol, 1,4-butanediol, neopentyl glycol, and 1,8-octanediol; alkanetriols having 3 to 30 carbon atoms such as glycerin, trimethylol propane; and polyoxypropylene glycol, for example propylene glycol syntheized from 20 to 100 mols of propylene oxide, preferably from 35 mols propylene oxide with an average molecular weight of 2020; cycloalkanols having 6 to 30 carbon atoms such as cyclohexanol; and phenyl alkanols having 7 to 30 carbon atoms such as benzyl alcohol.

Acid components of the esters employed according to the invention include aliphatic, cycloaliphatic or aromatic mono-, di-, or tricarboxylic acids having from 2 to 30 carbon atoms preferably having from 12 to 29 carbon atoms.

Suitable examples of aliphatic monocarboxylic acids having 2 to 30 carbon atoms preferably 12 to 27 carbon atoms include alkanoic acids of 2 to 30 preferably 12 to 27 carbon atoms such as acetic acid, propionic acid, butyric acid, capric acid, lauric acid, tridecylic acid, myristic acid, palmitic acid, margaric acid, stearic acid, arachic acid, eicosanecarboxylic acid, behenic acid, lignoceric acid, cerotic acid; branched-chain monocarboxylic acids such as branched chain alkanoic acids having 4 to 30, preferably 12 to 27 carbon atoms and obtained from the oxo-synthesis such as isooctanoic acid and isononanoic acid; hydroxyalkanoic acids of 2 to 30, preferably 12 to 27 carbon atoms such as hydroxystearic acid; alkenoic acids of 8 to 30, preferably 12 to 27, carbon atoms such as oleic acid, elaidic acid, erucic acid and montanic acid; hydroxyalkenoic acids of 8 to 30, preferably 12 to 27, carbon atoms such as ricinoleic acid; alkadienoic acids of 8 to 30, preferably 12 to 27, carbon atoms such as linoleic acid; alkatrienoic acids of 8 to 30, preferably 12 to 27 carbon atoms such as linolenic acid; fatty acids as well as mixtures of fatty acid fractions of 8 to 30, preferably 12 to 27 carbon atoms which are obtainable from natural fats and oils, for example fatty acid mixtures from olive oil, rape seed oil, coconut oil, palm oil, soybean oil, cottonseed oil and linseed oil. Examples of cycloaliphatic monocarboxylic acids having 6 to 30 carbon atoms include cycloalkanoic acids having 7 to 30, preferably 7 to 12 carbon atoms such as cyclohexane carboxylic acid. Examples of aromatic hydrocarbon moncarboxylic acids having 7 to 30, preferably 12 to 26, carbon atoms include benzoic acid and phenylstearic acid.

Suitable examples of dicarboxylic acids of 2 to 30, preferably 13 to 28, carbon atoms include saturated and unsaturated aliphatic hydrocarbon dicarboxylic acids of 2 to 30, preferably 13 to 28, carbon atoms for example, alkanedioic acids of 2 to 30 preferably 13 to 28, carbon atoms such as oxalic acid, malonic acid, succinic acid, glutaric acid, adipic acid, pimelic acid, suberic acid, azelaic acid, sebacic acid, nonanedioic acid, undecanedioic acid and eicosanedioic acid; alkenedioic acids of 4 to 30, preferably 13 to 28, carbon atoms such as maleic acid, fumaric acid, citraconic acid, mesaconic acid and itaconic acid; dihydroxyalkanedoic acids of 4 to 30, preferably 13 to 28, carbon atoms such as tartaric acid.

Other suitable examples of dicarboxylic acids include cycloaliphatic-dicarboxylic acids of 5 to 15, preferably 5 to 10, carbon atoms, for example cycloalkanedioic acids of 5 to 15, preferably 5 to 10 carbon atoms, such as cyclopropane-dicarboxylic acid, cyclobutane-dicarboxylic acid, cyclopentane-dicarboxylic acid, camphoric acid and hexahydrophthalic acid, as well as aromatic hydrocarbon dicarboxylic acids of 8 to 20, preferably 8 to 14, carbon atoms, for example, mononuclear aromatic dicarboxylic acids having 8 to 20 carbon atoms such as phthalic acid, terephthalic acid and isophthalic acid, and for example, dinuclear aromatic dicarboxylic acids having 8 to 20 carbon atoms such as naphthalic acid and diphenyl-O,O'-dicarboxylic acid.

Suitable examples of tricarboxylic acids having from 6 to 30, preferably 14 to 29, carbon atoms include saturated and unsaturated aliphatic tricarboxylic acids having 6 to 30, preferably 14 to 29 carbon atoms, for example alkanetrioic acids having 6 to 30, preferably 14 to 29 carbon atoms such as hexanetrioic acid, and hydroxyalkanetrioic acids having 6 to 30, preferably 14 to 29 carbon atoms, such as citric acid. Suitable examples of cycloaliphatic tricarboxylic acids having 9 to 30, preferably 12 to 26, carbon atoms include cycloalkanetrioic acids having 9 to 30, preferably 12 to 26, carbon atoms, such as hexahydrobenzene tricarboxylic acid. Suitable examples of aromatic hydrocarbon tricarboxylic acids are aromatic mononuclear tricarboxylic acids having 9 to 30, preferably 12 to 26, carbon atoms include trimellitic acid and trimesitinic acid.

In order to be suitable for use according to the invention, it is also necessary that either the alcohol component or the acid component or both components of the esters contain an aliphatic hydrocarbon radical with 11 to 26 carbon atoms, preferably alkyl of 11 to 26 carbon atoms.

Suitable examples of esters according to the invention include the following esters: (ethyl·4PrO·4EO) stearate, (2-ethyl-hexyl·8PrO·8EO) palmitate, (lauryl·10EO) laurate, (stearyl·20EO) caprate, (cetyl-stearyl·20EO) acetate, di-(iso-palmityl·10EO) adipate, mono-(isotridecyl·20EO) succinate, (hydroxystearyl·85EO) stearate, (ethylene glycol·10 EO) monobehenate, (glycerin·8PrO·8EO) dilaurate, mono-(cetyl-stearyl·10EO) phthalate, di-(cetyl-stearyl·10EO)phthalate, (35PrO·33.6 EO-adduct)mono-stearate, (35 PrO·33.6 EO-adduct) di-stearate, (cyclohexayl·20EO) stearate-palmitate, and (benzyl·30EO) hydroxylstearate. The cetyl-stearyl is a mixture of cetyl and stearyl alcohols, the stearate-palmitate is a mixture of stearic and palmitic acid.

The lubricants according to the invention are added to the molding compositions or to the resin dispersion to be processed in an effective amount such that the addition based upon the resin substance, is from 0.1 to 5% by weight, preferably from 0.5 to 2% by weight. The additives produce an excellent fluidity of the molding composition and an excellent separation from the mold, even in very small amounts, for example, 0.1% by weight, and shows no detrimental effects on the quality of the products formed, even in relatively large amounts.

Advantages of the ester lubricants according to the invention are that they can readily be worked into the thermosetting molding compositions. If the precondensate is present in an aqueous or alcohol dispersion or solution, the lubricant according to the invention is dissolved therein or emulsified without the addition of an emulsifier. After drying and crushing of the molding composition, the lubricant is present in homogenous dispersion. The reaction water formed during the shaping treatment by the cross-linking condensation does not change the compatibility of the lubricant, so that incompatibility phenomenon are avoided. During the preparation of the molding compositions on rolling mills, kneaders or in screw presses, the lubricants according to the invention readily prevent stickiness and premature local cross-linking and hardening. During shaping, non-cutting pretreatment by pressing, extruding or injection-molding, those molding compositions with a content of 0.05 to 2% by weight of the lubricant additives according to the invention, calculated as esters based upon the resin content, shows a particularly low melt viscosity and high inner mold separating effect. Particularly in injection-molding, premature hardening in the injection cylinder caused by friction, is thusly eliminated. Molded parts from molding compositions containing the lubricant additives according to the invention, are characterized, due to their fluidity, by optimum surface formation with a minimum of dimensional deviations and the absence of internal stresses. The use of external mold release agents for molds is not necessary.

The following examples are merely illustrative of the present invention without being deemed limitative in any manner thereof.

EXAMPLES

EXAMPLE 1

Production of esters to be used according to the invention. Ester A-(ethoxylated hydroxystearyl) stearate Into a three necked flask equipped with a stirrer were charged 82 gm of hydroxystearyl alcohol and 8 ml of a methanolic 30% solution of sodium methylate. The flask was flushed with nitrogen, evacuated for 10 minutes at 70°C and heated to 170°C. Then 918 gm of ethylene oxide were added and a reaction ensued. The yield was 930 gm of a light-brown liquid, which was immediately reacted further by esterification. For the esterification reaction, 75 gm of stearic acid and 10 gm of p-toluene sulfonic acid were added, heated to 180°C, and esterified while passing nitrogen therethrough. After separation of 4.7 gm of water, the mixture was subjected to bleaching, filtering and cooling. The resulting product was a hard wax like yellowish, practically odorless ester with an acid number of 3. It could be readily crused in a mill. Its solubility in water, methanol, ethanol and chlorinated hydrocarbons was very good; but it was practically insoluble in nonpolar aliphatic and aromatic hydrocarbons.

Ester B-(35PrO·33.6 EO-adduct) monostearate

Into a three-necked flask equipped with a stirrer were charged 930 gm of an addition product of 33.6 mols of ethylene oxide on a polypropyleneglycol with an average molecular weight of 2,020 (that is, 35 propylene oxide units), 75 gm of stearic acid and 10 gm of p-toluene-sulfonic acid, heated at 180°C and esterified for several hours in an atmosphere of nitrogen. After separating 4.7 gm of water, the mixture was subjected to bleaching, filtering and cooling. The resulting product was a polyoxypropylene glycol-polyoxyethylene glycol monostearate, a light brown paste with an acid number of 2.4, which was soluble in water giving a 40% solution.

Ester C-(35PrO·33.6EO-adduct) distearate

Into a three-necked flask equipped with a stirrer were charged 868 gm of the polypropyleneglycol-ethylene oxide-addition product, previously described above in ester B, 141 gm of stearic acid and 10 gm of p-toluene-sulfonic acid, and reacted according to the same procedure for ester B. After the separating of 9 gm of water, the mixture was subjected to bleaching, filtering and cooling. The resulting product was polyoxypropyleneglycol-polyoxyethyleneglycol di-stearate, a light-brown paste with an acid-number of 3.2 and a saponification number of 32. The product was soluble in water giving a 40% solution.

Ester D - Di-(cetyl-stearyl.10EO) phthalate

Into a 1 liter three-necked flask equipped with a stirrer, thermometer, descending cooler and vacuum receiver, were charged 75 gm (0.5 mol) of phthalic acid anhydride, 580 gm (1 mol) of a condensation product of 1 mol of a fatty alcohol mixture consisting of equal parts by weight of cetyl alcohol and stearyl alcohol and 10 mols of ethylene oxide, 4 gm of powdered tin and 6.6 gm of activated charcoal. The reaction was carried out in a vacuum of 100 Torr and 200°C for 5 hours. The acid number had then dropped to 3.6. After cooling to 80°C, the reaction product was treated for 10 minutes with 6.6 gm of bleaching earth, there was filtered and cooled. A soft wax-like solid, slightly yellowish ester was obtained and had the following characteristics:

| | |
|---|---|
| Drop forming temperature | 29°C |
| Acid number | 2.8 |
| Saponification number | 77 |
| Hydroxyl number | 9 |
| The product was self-emulsifying in water at 40°C. | |

EXAMPLE 2

Molding compositions on the following constituents were processed in a high-speed mixer to powder consistency. All parts are by weight usless otherwise specified:

Composition 1:
  50 parts novolac-phenol-formaldehyde resin containing hexamethylene tetramine (novolac: hexamethylene tetramine of 91:9, commercial product Bakelite Resin 222,
  50 parts wood meal and
  1 part magnesium oxide.

Composition 2:
  101 parts of composition 1 and
  1 part of Ester A.

Both compositions were tested in a Brabender plastograph for their flow-hardening behavior. The testing conditions were as follows: kneading chamber with 30 gm capacity and a shell temperature of 135°C; the charge was 28gm; and the mixing speed was 20 rpm.

Referring to FIG. 1, the kneading diagrams show that the rising leg for composition 2 rises to a much lower level of kneading resistance, as a result of the lubricating effect of the esters according to the invention than does the rising leg for composition 1 devoid of said ester. The point of maximum kneading resistance for composition 1 was outside the measuring range of the measuring apparatus. The point of maximum kneading resistance for composition 2 was about 6 mkp/sec, and was much lower than for composition 1, since the ester according to the invention prevented excessive friction.

EXAMPLE 3

Into a three necked flask equipped with a stirrer and reflux condenser, 600 gm of urea and 1,140 gm of 40% formalin (corresponding to 460 gm of formaldehyde) were reacted at 80°C. To the resulting resin solution were added 20 gm of polyoxypropyleneglycol polyoxyethyleneglycol mono-stearate (Ester B). The lubricant dissolved completely. The cooled solution was transferred into a kneader which contained 1,000 gm of bleached cellulose in flake form. After kneading for several hours, the homogenous mass was dried for several hours in a circulating air drier at 70°C, and then granulated in a laboratory extrusion press with a cutting device. Plates of the granulated material were pressed in a heated press under the following conditions: chrome plated pressing plates or jaws with 1 mm spacers; pressing temperature of 150°C: pressing time of 2 minutes; pressing pressure of 100 kg per cm².

The plates obtained could be readily separated from the pressing faces without using an external mold release agent on the pressing surfaces. The resulting plates left no deposit on the pressing surfaces event after several pressings. The resulting plates were completely homogenous, smooth and highly polished.

EXAMPLE 4

Into a wide-necked flanged flask equipped with a stirrer and a reflux condenser, 126 gm of melamine and 365 gm of a neutralized aqueous 37% solution of formaldehyde were condensed under reflux, until a sample showed upon dilution with an equal amount of water, precipitation of the resin formed. Then 10 1 gm of an aqueous 40% solution of polyoxypropyleneglycol polyoxyethyleneglycol di-stearate (Ester C) were added, which dissolved without clouding. The cooled reaction mixture was kneaded with 100 gm of bleached cellulose flakes in a kneader until it was homogeneous; dried in a circulating air dryer at 70°C; crushed in a grinding mill; and pressed into plates without any further treatment in the same manner as described in Example 3. The plates showed a very satisfactory separation from the mold; and the plates had a smooth and bright surface and left no residues on the pressing surfaces of the mold. The bond of the plates was not disturbed even after boiling for several hours in water.

EXAMPLE 5

Molding compositions of the following constituents were prepared in a high speed mixer to a powdery consistency. All parts are by weight unless otherwise specified:

Composition 1:
  45.5 parts of novolac-phenol-formaldehyde resin (commercial product: Bakelite Resin 207)
  4.5 parts of hexamethylene tetramine
  50 parts of industrial chalk
  1 part of magnesium oxide Composition 2:
  101 parts of composition 1
  1 part of di-(cetyl-stearyl-alcohol·10EO) phthalate (Ester D)

Both compositions were tested for their flow behavior in a Brabender plastograph under the following conditions: kneading chamber with 30 gm capacity and a shell temperature of 135°C; charge of 28 gm, mixer blade speed of 20 rpm; duration of test was 7 minutes during which time there was no hardening of either composition.

Referring to FIG. 2, the kneading diagrams show that there was a considerably lower level of the kneading resistance for composition 2 versus composition 1 as a result of the lubricating action of the ester according to the invention.

Although the present invention and has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. An unhardened thermosetting resin composition containing thermosetting resin constituents selected from the group consisting of a phenoplast resin, an aminoplast resin and the mixtures thereof, and an effective amount of a lubricant additive useful in the shaping of thermosetting material comprising a partial or complete ester of (A) an addition product 8 to 100 mols of an alkylene oxide selected from the group consisting of ethylene oxide and mixtures of ethylene oxide and propylene oxide per mol of a hydrocarbon compound having 1 to 3 hydroxyl groups and 2 to 30 carbon atoms with (B) a hydrocarbon carboxylic acid having 1 to 3 carboxyl groups and 2 to 30 carbon atoms selected from the group consisting of an aliphatic carboxylic acid, a cycloaliphatic carboxylic acid and an aromatic carboxylic acid, with the proviso that at least one of the components (A) or (B) contains an aliphatic hydrocarbon radical of 11 to 26 carbon atoms.

2. The unhardened thermosetting resin composition of claim 1, in which said compound having 1 to 3 hydroxyl groups utilized in the addition product of (A) is selected from the group consisting of alkanols having 2 to 30 carbon atoms, alkanediols having 2 to 30 carbon atoms, alkanetriols having 3 to 30 carbon atoms, polyoxypropylene glycol having from 20 to 100 mols of propylene oxide units, cycloalkanols having 6 to 30 carbon atoms, aromatic hydrocarbon alcohols having 6 to 30 carbon atoms, and the mixtures therof; and in which said carboxylic acid having 1 to 3 carboxyl groups and 2 to 30 carbon atoms of (B) is selected from the group consisting of alkanoic acids having 2 to 30 carbon atoms, hydroxyalkanoic acids having 2 to 30 carbon atoms, alkenoic acids having 8 to 30 carbon atoms, hydroxyalkenoic acids having 8 to 30 carbon atoms, alkadienoic acids having 8 to 30 carbon atoms, alkatrienoic acids having 8 to 30 carbon atoms, cycloalkane carboxylic acids having 6 to 30 carbon atoms, aromatic hydrocarbon monocarboxylic acids having 7 to 30 carbon atoms, alkanedioic acids having 2 to 30 carbon atoms, alkenedioic acids having 4 to 30 carbon atoms, dihydroxyalkanedioic acids having 4 to 30 carbon atoms, cycloalkane di-carboxylic acids having 6 to 15 carbon atoms, mononuclear aromatic hydrocarbon dicarboxylic acids having 8 to 20 carbon atoms, dinuclear aromatic hydrocarbon dicarboxylic acids having 8 to 20 carbon atoms, alkanetrioic acids having 6 to 30 carbon atoms, hydroxyalkanetrioic acids having 6 to 30 carbon atoms, cycloalkane tri-carboxylic acids having 9 to 30 carbon atoms, mononuclear aromatic hydrocarbon tricarboxylic acids having 9 to 30 carbon atoms, and the mixtures thereof; with the proviso that at least one of the components (A) or (B) contains an aliphatic hydrocarbon radical of 11 to 26 carbon atoms.

3. The unhardened thermosetting resin composition of claim 1, in which said compound having 1 to 3 hydroxyl groups of (A) is an aliphatic alcohol having 11 to 26 carbon atoms.

4. The unhardened thermosetting resin composition of claim 1, in which said compound having 1 to 3 hydroxyl groups of (A) is polyoxypropyleneglycol having from 20 to 100 mols of propylene oxide units.

5. The unhardened thermosetting resin composition of claim 1, in which said carboxylic acid having 1 to 3 carboxyl groups of (B) is an aliphatic monocarboxylic acid having 12 to 27 carbon atoms.

6. The unhardened thermosetting resin composition of claim 1, in which said carboxylic acid having 1 to 3 carbon atoms of (B) is a fatty acid having 12 to 27 carbon atoms or a mixture of fatty acid fractions having 12 to 27 carbon atoms obtainable from natural fats and oils.

7. The unhardened thermosetting resin composition of claim 1, wherein said ester is selected from the group consisting of (ethyl·4PrO·4EO) stearate, (2-ethylhexyl·8PrO·8EO) palmitate, (lauryl·10EO) laurate, (stearyl·20EO) caprate, (cetyl-stearyl·20EO) acetate, (diisopalmityl·10EO) adipate, (monoisotridecyl·20EO) succinate, (hydroxystearyl·85EO) stearate, (ethylene glycol·10EO) monobehenate, (glycerin·8PrO·8EO) dilaurate, mono-(cetyl-stearyl·10EO) phthalate, di-(cetyl-stearyl·10EO) phthalate, (35PrO·33.6EO-adduct)-monostearate, (35PrO·33.6EO-adduct)-distearate, cychlohexyl·20EO) stearate-palmitate (benzyl·30EO) hydroxystearate, and the mixtures thereof.

8. The unhardened thermosetting resin composition claim 7, wherein said ester is selected from the group consisting of (hydroxystearyl·85EO) stearate, (35PrO·33.6EO-adduct) monostearate, (35PrO·33.6EO-adduct) distearate, di-(cetyl-stearyl·10EO) phthalate, and the mixtures thereof.

9. The unhardened thermosetting resin composition of claim 1, which contains from 0.1% to 5% by weight of said lubricant additive with the balance up to 100% being said thermosetting resin constituents.

10. The composition according to claim 9, in which there is from 0.5% to 2% by weight of said lubricant additive according to claim 1.

11. In the process for shaping thermosetting material which comprises adding a lubricant additive to thermosetting material selected from the group consisting of a phenoplast resin, an aminoplast resin and the mixtures thereof and then shaping said thermosetting material, the improvement which consists in utilizing from 0.1% to 5% by weight of a partial or complete ester of (A) an addition product 8 to 100 mols of an alkylene oxide selected from the group consisting of ethylene oxide and mixtures of ethylene oxide and propylene oxide per mol of a hydrocarbon compound having 1 to 3 hydroxyl groups and 2 to 30 carbon atoms with (B) a hydrocarbon carboxylic acid having 1 to 3 carboxyl groups and 2 to 30 carbon atoms selected from the group consisting of an aliphatic carboxylic acid, a cycloaliphatic carboxylic acid and an aromatic carboxylic acid, with the proviso that at least one of the components (A) or (B) contains an aliphatic hydrocarbon radical of 11 to 26 carbon atoms, as said lubricant additive.

12. The process according to claim 11 in which from 0.5 to 2% by weight of said lubricant additive is utilized.

13. The unhardened thermosetting resin composition of claim 1, wherein said thermosetting resin constituents are selected from the group consisting of
  A. a phenoplast resin condensation product of (i) a member selected from the group consisting of phenol, cresols, xylenols, naphthols and polyhydroxy phenols with (ii) a member selected from the group consisting of formaldehyde and polymeric formaldehyde,
  B. an aminoplast resin condensation product of (i) a member selected from the group consisting of urea, guanadine, substituted ureas, melamine, substituted melamines and aniline with (ii) a member selected from the group consisting of formaldehyde, polymeric formaldehyde and furfural, and
  C. the mixtures of (A) and (B).

* * * * *